(12) United States Patent
Poliyapram et al.

(10) Patent No.: US 12,704,377 B2
(45) Date of Patent: Aug. 11, 2026

(54) INFORMATION PROCESSING APPARATUS, INFORMATION PROCESSING METHOD, NON-TRANSITORY COMPUTER READABLE MEDIUM, AND LEARNING MODEL

(71) Applicant: RAKUTEN GROUP, INC., Tokyo (JP)

(72) Inventors: Vinayaraj Poliyapram, Tokyo (JP); Kyle Aaron Mede, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 242 days.

(21) Appl. No.: 18/685,278

(22) PCT Filed: Apr. 28, 2022

(86) PCT No.: PCT/JP2022/019259
§ 371 (c)(1),
(2) Date: Sep. 24, 2024

(87) PCT Pub. No.: WO2023/209938
PCT Pub. Date: Nov. 2, 2023

(65) Prior Publication Data

US 2025/0020474 A1 Jan. 16, 2025

(51) Int. Cl.
*G06Q 50/40* (2024.01)
*G01C 21/10* (2006.01)
(Continued)

(52) U.S. Cl.
CPC ............. *G01C 21/28* (2013.01); *G01C 21/10* (2013.01); *G06Q 10/04* (2013.01); *G06Q 50/40* (2024.01); *G08G 1/01* (2013.01)

(58) Field of Classification Search
CPC ........ G01C 21/28; G01C 21/10; G01C 21/30; G06Q 10/04; G06Q 50/40; G08G 1/01; G08G 1/13
See application file for complete search history.

(56) References Cited

U.S. PATENT DOCUMENTS 5,884,296 A 3/1999 Nakamura et al.
2011/0137833 A1 6/2011 Ide et al.
(Continued)

FOREIGN PATENT DOCUMENTS

EP 3 719 448 A1 10/2020
JP 8-251405 A 9/1996
(Continued)

OTHER PUBLICATIONS

Ifigenia Drosouli, et al., "Transportation Mode Detection Using an Optimized Long Short-Term Memory Model on Multimodal Sensor Data," Entropy, vol. 23, 1457, 2021, pp. 1-20.
(Continued)

*Primary Examiner* — Rodney A Butler
(74) *Attorney, Agent, or Firm* — Sughrue Mion, PLLC

(57) ABSTRACT

An information processing apparatus acquires a movement trajectory of a user, derives, from the movement trajectory, movement information indicating features relating to movement, and estimates, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

10 Claims, 8 Drawing Sheets

(51) Int. Cl.

| | |
|---|---|
| ***G01C 21/28*** | (2006.01) |
| ***G06Q 10/04*** | (2023.01) |
| ***G08G 1/01*** | (2006.01) |

(56) References Cited

U.S. PATENT DOCUMENTS

| | | | | |
|---|---|---|---|---|
| 2018/0181860 | A1* | 6/2018 | Verbist | G06N 3/08 |
| 2023/0194288 | A1* | 6/2023 | Lim | G06N 3/044 |

FOREIGN PATENT DOCUMENTS

| | | | |
|---|---|---|---|
| JP | 2011-118776 | A | 6/2011 |
| JP | 2013-061828 | A | 4/2013 |
| JP | 2016-218812 | A | 12/2016 |
| JP | 2020-144543 | A | 9/2020 |
| WO | 2015/170385 | A1 | 11/2015 |

OTHER PUBLICATIONS

International Search Report for PCT/JP2022/019259 dated Jul. 12, 2022.

* cited by examiner

START
S41
ACQUIRE MAP INFORMATION
S42
ACQUIRE USER TRAJECTORY
S43
SPACIALLY COMBINE MAP INFORMATION AND USER TRAJECTORY AND ASSIGN SOFT LABEL TO USER TRAJECTORY
S44
ACQUIRE MOVEMENT INFORMATION
S45
ACQUIRE LABELING FUNCTION
S46
APPLY SOFT LABEL AND MOVEMENT INFORMATION TO LABELING FUNCTION TO ASSIGN LABEL
END

61
LABEL
CAR
RAIL
BUS
BICYCLE
WALKING
BOAT/SHIP
6
32
64
128
72
96
711
256
128
32
712
256
128
64
64
71
121
USER TRAJECTORY
123
MOVEMENT INFORMATION

INFORMATION PROCESSING APPARATUS, INFORMATION PROCESSING METHOD, NON-TRANSITORY COMPUTER READABLE MEDIUM, AND LEARNING MODEL

CROSS REFERENCE TO RELATED APPLICATIONS

This application is a National Stage of International Application No. PCT/JP2022/019259 filed Apr. 28, 2022.

TECHNICAL FIELD

The present invention relates to an information processing apparatus, an information processing method, a program thereof, and a learning model, and in particular to a technology that predicts a mode of transport of a user.

BACKGROUND ART

A technology that predicts, through machine learning, a mode of transport (such as walking, car, bus, or train) of a user from sensor data obtained from a smartphone carried by the user has been developed (see Non-Patent Literature Document 1).

LISTING OF REFERENCES

Patent Literature Documents

Non-Patent Literature Document 1: Ifigenia Drosouli, et al., "Transportation Mode Detection Using an Optimized Long Short-Term Memory Model on Multimodal Sensor Data", Entropy, vol. 23, issue 11, p. 1457, November 2021

SUMMARY OF THE INVENTION

Problems to be Solved by the Invention

The technology disclosed in cited non-patent literature 1 predicts the mode of transport of a user from six sensors installed in a smartphone (specifically an acceleration sensor, a gyroscope, a geomagnetic sensor, a pressure sensor, GPS (altitude measurement), and temperature). However, to use this method, six sensors must be installed in every smartphone to predict the mode of transport, resulting in demand for a method of predicting the mode of transport more efficiently.

The present invention was conceived to solve the problem described above, and it is one object of the present invention to provide a machine learning technology for predicting the mode of transport of a user efficiently and with high accuracy.

Solution to the Problems

To solve the problem described above, one aspect of an information processing apparatus according to the present invention includes: an acquisition unit configured to acquire a movement trajectory of a user; a derivation unit configured to derive, from the movement trajectory, movement information indicating features relating to movement; and an estimating unit configured to estimate, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network may be configured to generate combined feature amounts by combining the feature amounts of the movement trajectory and the feature amounts of the movement information, and output data indicating the mode of transport of the user from the combined feature amounts.

The learning model may be configured to output probabilities of a plurality of modes of transport being the mode of transport of the user, as the data indicating the mode of transport of the user, and the estimating unit estimates a mode of transport with the highest probability as the mode of transport of the user.

The movement trajectory may include a latitude and a longitude of a location of the user at intervals of a predetermined time.

The movement information may include at least one of a speed, acceleration, jerk, bearing, and bearing difference between two points on the movement trajectory and a speed difference, acceleration difference, average speed, average speed difference, and average acceleration between a plurality of pairs of two points.

The mode of transport may include at least one of car, train, bus, bicycle, walking, and boat or ship.

The information processing may further include an output unit configured to output information on the mode of transport estimated by the estimating unit.

The output unit may generate and output an advertisement relating to the mode of transport estimated by the estimating unit.

To solve the problem described above, one aspect of an information processing method according to the present invention includes an acquisition step of acquiring a movement trajectory of a user; a derivation step of deriving, from the movement trajectory, movement information indicating features relating to movement; and an estimating step of estimating, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

To solve the problem described above, one aspect of a program, according to the present invention is an information processing program for causing a computer to execute information processing, the program causing the computer to execute processing including: an acquisition process for acquiring a movement trajectory of a user; a derivation process for deriving, from the movement trajectory, movement information indicating features relating to movement; and an estimating process for estimating, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

To solve the problem described above, one aspect of a learning model according to the present invention includes a first network including a first branch for inputting a movement trajectory of a user and generating feature amounts of the movement trajectory and a second branch for inputting movement information relating to movement derived from the movement trajectory and generating feature amounts of the movement information; and a second network configured to generate combined feature amounts by combining the feature amounts of the movement trajectory and the feature amounts of the movement information and to output data indicating a mode of transport of the user from the combined feature amounts.

Advantageous Effects of the Invention

According to the present invention, a machine learning technology for predicting a mode of transport of the user efficiently and high accuracy is provided.

The object, aspects, and effects of the present invention described above and objects, aspects, and effects of the present invention that are not described above can be understood by those skilled in the art from the embodiments of the present invention described below by referring to the accompanying drawings and the range of the patent claims.

DESCRIPTION OF EMBODIMENTS

Figure 1:
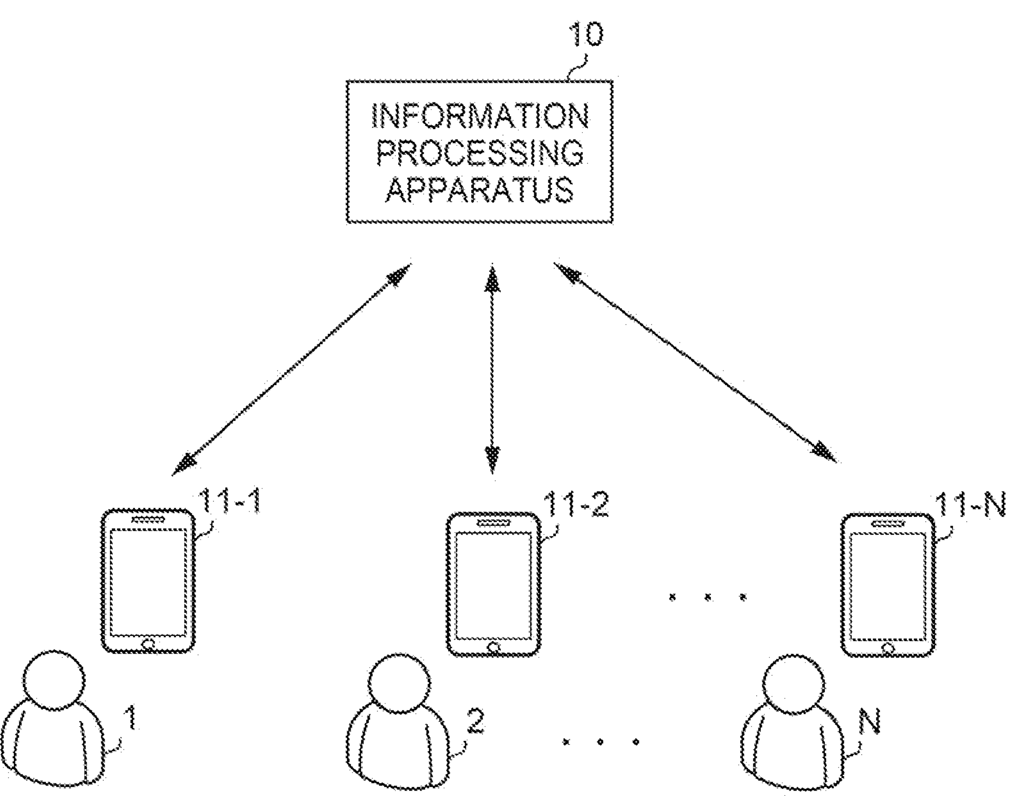
FIG. 1 depicts an example configuration of an information processing system.

Embodiments of the present invention will now be described in detail with reference to the accompanying drawings. Out of the component elements described below, elements with the same functions have been assigned the same reference numerals, and description thereof is omitted. Note that the embodiments disclosed below are mere example implementations of the present invention, and it is possible to make changes and modifications as appropriate according to the configuration and/or various conditions of the apparatus to which the present invention is to be applied. Accordingly, the present invention is not limited to the embodiments described below. The combination of features described in these embodiments may include features that are not essential when implementing the present invention.

Example Configuration of Information Processing System

FIG. 1 depicts an example configuration of an information processing system according to the present embodiment. As one example, as depicted in FIG. 1, this information processing system includes an information processing apparatus 10 and a plurality of user devices 11-1 to 11-N (where N>1) that are used by a freely chosen plurality of users 1 to N. Note that in the following description, unless otherwise specified, the user devices 11-1 to 11-N may be collectively referred to as the "user devices 11". In the following description, the terms "user device" and "user" may be used interchangeably.

As one example, each user device 11 is a device such as a smartphone or a tablet, and is configured so as to be capable of communicating with the information processing apparatus 10 via a public network such as LTE (Long Term Evolution) or a wireless communication network such as a wireless LAN (Local Area Network). Each user device 11 includes a display unit (or "display screen") such as a liquid crystal display, with each user being capable of performing various operations using a GUI (Graphic User Interface) provided on the liquid crystal display. Such operations include various operations performed on content, such as images displayed on the screen, as examples a tap operation, a slide operation, and a scroll operation performed using a finger, a stylus, or the like.

Note that the user devices 11 are not limited to the devices depicted in FIG. 1, and may be devices such as a tablet computer or a notebook PC. The user device 11 may be provided separately to the display screen.

A user device 11 can log into a web service (or "Internet-related service") provided from the information processing apparatus 10 itself or from another apparatus (not illustrated) via the information processing apparatus 10 and use this service. These web services may include an online shopping mall, an online supermarket, and/or services related to communication, finance, real estate, sports, and travel provided via the Internet. By using these web services, a user device 11 can transmit information relating to the user of the user device 11 to the information processing apparatus 10.

As one example, a user device 11 can transmit attribute information (hereinafter referred to as "user attribute information") related to the user device and the user, such as the IP (Internet Protocol) address of the user device 11, the address of the user, and the name of the user, to the information processing apparatus 10.

The user device 11 is also capable of position calculations based on signals received from GPS (Global Positioning System) satellites (not shown) or the like, and can use information such as latitude, longitude, and altitude obtained by such calculations as position information of the user device 11 which can be transmitted to the information processing apparatus 10.

The information processing apparatus 10 acquires various information from the user devices 11 and performs various processing based on such information to generate training data for machine learning about predicting the mode of transport of a user and to predict of the mode of transport.

Functional Configuration of Information Processing Apparatus 10 The information processing apparatus 10 according to the present embodiment first acquires various information from the user devices 11-1 to 11-N, and generates training data (or "teacher data") for training a mode-of-transport prediction model 111, which is a machine learning model for predicting a mode of transport of the user. Next, the information processing apparatus 10 trains the mode-of-transport prediction model 111 using the generated training data. In addition, the information processing apparatus 10 uses the trained mode-of-transport prediction model 111 to predict the mode of transport of any freely chosen user.

Figure 2:
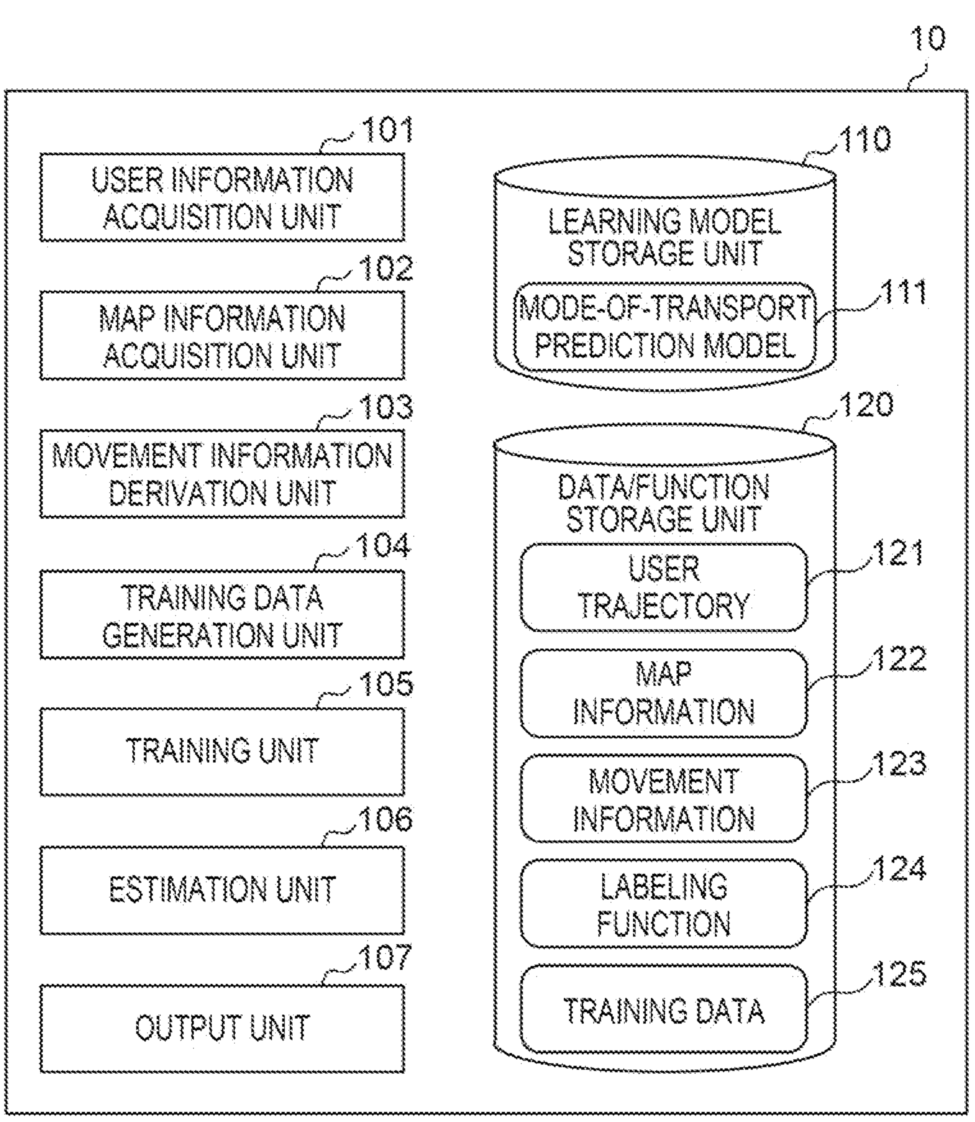
FIG. 2 depicts an example functional configuration of an information processing apparatus.

FIG. 2 is a block diagram depicting one example of the functional configuration of the information processing apparatus 10 according to the present embodiment.

The information processing apparatus 10 depicted in FIG. 2 includes a user information acquisition unit 101, a map information acquisition unit 102, a movement information derivation unit 103, a training data generation unit 104, a training unit 105, an estimation unit 106, an output unit 107, a learning model storage unit 110, and a data storage unit 120. The learning model storage unit 110 is configured so as to be capable of storing the mode-of-transport prediction model 111. The data storage unit 120 is also configured so as to be capable of storing a user trajectory 121, map information 122, movement information 123, a labeling function 124, and training data 125.

The user information acquisition unit 101 acquires information on movement by the user from each of the user devices 11-1 to 11-N. In more detail, the user information acquisition unit 101 acquires a plurality of position information (hereinafter referred to as a "user trajectory") that is continuous within a certain period of time and indicates a movement trajectory. This certain period of time can be freely set. As one example, the certain period of time may be a period of time during which the user is continuously moving (that is, the user does not stop for a long time). Each location information includes at least latitude and longitude to which a time stamp (that is, date/time information or time information) has been appended (that is, latitude and longitude with a time stamp). The user information acquisition unit 101 may also acquire user attribute information from each of the user devices 11-1 to 11-N. The user information acquisition unit 101 stores each acquired user trajectory in the data storage unit 120 as a user trajectory 121.

The map information acquisition unit 102 acquires map information using a freely chosen service (such as a website or database). As described later, as one example, the map information includes information relating to road networks, railway networks, bus route networks, and boundaries of regional areas (for example, prefectures and states) (hereinafter, referred to as "regional area information"). The map information acquisition unit 102 stores the acquired map information in the data storage unit 120 as the map information 122.

The movement information derivation unit 103 derives features which relates to movement in the user trajectory 121 (hereinafter referred to as "movement information") from the user trajectory 121 over a certain period of time that is stored in the data storage unit 120. In more detail, the movement information derivation unit 103 derives the movement information using the respective position information of two points that have been appended with time stamps. In the present embodiment, the movement information may include speed, acceleration, jerk (that is, the rate of change in acceleration with respect to time), bearing, and bearing difference between the two points (that is, between a first position (before movement) and a second position (after movement)).

The distance x between two points can be derived indicated in Equation (1) below.

$$x = 2r \arcsin\left(\sqrt{\sin^2\frac{(\phi_2 - \phi_1)}{2} + \cos(\phi_1)\cos(\phi_2)\sin^2\frac{\lambda_2 - \lambda_1}{2}}\right) \quad (1)$$

Here, $\theta_1$ and $\theta_2$ represent the latitude of the first position and the latitude of the second position (in radians), and $\lambda_1$ and $\lambda_2$ represent the longitude of the first position and the longitude of the second position (in radians). r represents the radius (in meters) of the Earth (as a sphere).

The speed v of the user between two points can be derived as indicated in Equation (2) using the distance x derived from Equation (1).

$$v = \frac{dx}{dt} \quad (2)$$

The acceleration a of the user between the two points can be derived as indicated in Equation (3) using the distance x derived from Equation (1) and the speed v derived from Equation (2).

$$a = \frac{dv}{dt} \quad (3)$$

The jerk j can be derived as indicated in Equation (4) using the distance x derived from Equation (1), and the speed v derived from Equation (2) or the acceleration a derived from Equation (3).

$$j = \frac{da}{dt} = \frac{d^2v}{dt^2} = \frac{d^3x}{dt^3} \quad (4)$$

The bearing between the two points can be derived as indicated in Equation (5).

$$\text{bearing} = a\tan 2(X, Y) \quad (5)$$

Here, X and Y are expressed as indicated in Equations (6) and (7), respectively.

$$X = \cos(\phi_2) * \sin(\lambda_2 - \lambda_1) \quad (6)$$

$$Y = \cos(\phi_1) * \sin(\phi_2) - \sin(\phi_1) * \cos(\phi_2) * \cos(\lambda_2 - \lambda_1) \quad (7)$$

The bearing difference between a plurality of points can be derived as indicated in Equation (8) using the bearings between a plurality of pairs of two points derived from Equation (5).

$$bearingDifference = \Delta\text{bearing} \quad (8)$$

In addition, the movement information derivation unit 103 is capable of deriving, from the speed v and the acceleration a between a plurality of pairs of two points, a speed difference (Speed_diff), an acceleration difference (Acceleration_diff), an average speed (Avg_speed), an average speed difference (Avg_speed_diff), and an average acceleration (Avg_acceleration) as movement information. This means that in the present embodiment, the movement information may include at least one of the speed, acceleration, jerk, bearing, and bearing difference between two points, and the speed difference, acceleration difference, average speed, average speed difference, and average acceleration between a plurality of pairs of two points.

The movement information derivation unit 103 stores the derived movement information in the data/function storage unit 120 as the movement information 123.

The training data generation unit 104 generates a labeling function 124 and stores the labeling function 124 in the data/function storage unit 120. The labeling function 124 will be described later. The training data generation unit 104 also generates training data (teacher data) for training the mode-of-transport prediction model 111 using the labeling function 124. The training data generation unit 104 stores the generated training data in the data/function storage unit 120 as the training data 125. The procedure for generating the training data will be described later.

The training unit 105 uses the training data 125 generated by the training data generation unit 104 to train the mode-of-transport prediction model 111. The procedure for training the mode-of-transport prediction model 111 will be described later.

The estimation unit 106 uses the mode-of-transport prediction model 111 to estimate, from a user trajectory acquired from a freely chosen user, the mode of transport of that user corresponding to the user trajectory.

The output unit 107 outputs the result (or "estimation result") of the user's mode of transport estimated by the estimation unit 106. The output unit 107 may generate and output information (for example, an advertisement) based on the estimation result. This "output" may be any output process, and may be an output to an external apparatus via a communication interface (the "communication interface 37" in FIG. 3), or displaying on a display unit (the "display unit 36" in FIG. 3).

Hardware Configuration of Information Processing Apparatus 10

Figure 3:
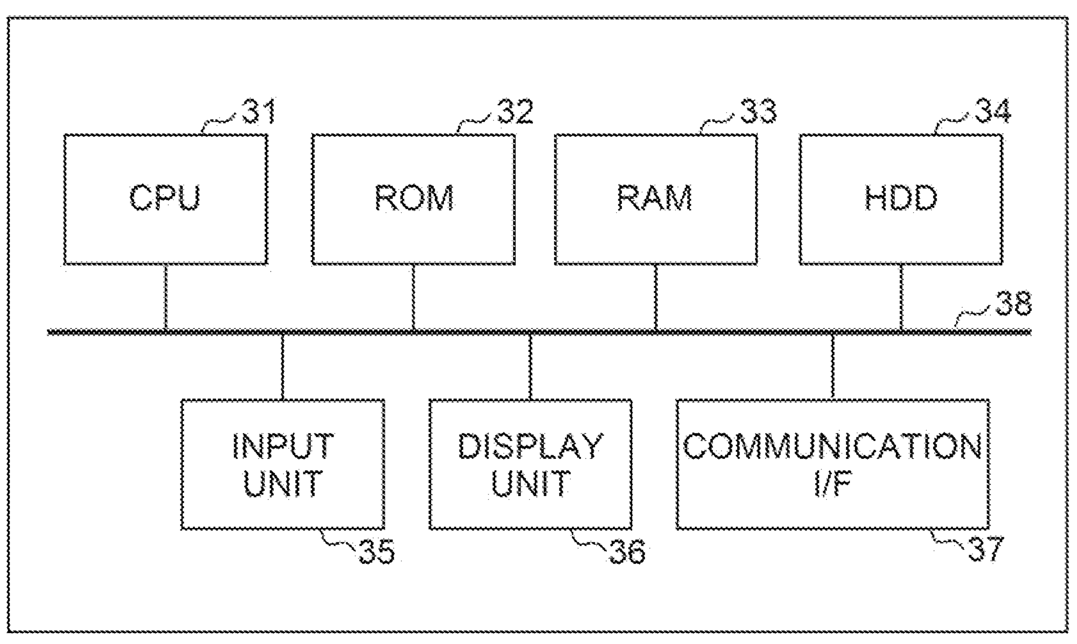
FIG. 3 depicts one example hardware configuration of the information processing apparatus.

FIG. 3 is a block diagram depicting one example of the hardware configuration of the information processing apparatus 10 according to the present embodiment.

The information processing apparatus 10 according to the present embodiment can be implemented on one or a plurality of so-called computers, mobile devices, or other processing platforms.

Although FIG. 3 depicts one example where the information processing apparatus 10 is implemented on a single computer, the information processing apparatus 10 according to the present embodiment may be implemented in a computer system including a plurality of computers. The plurality of computers may be connected to each other via a wired or wireless network to enable communication between the computers.

As depicted in FIG. 3, the information processing apparatus 10 may include a CPU 31, a ROM 32, a RAM 33, an HDD 34, an input unit 35, a display unit 36, the communication interface 37, and a system bus 38. The information processing apparatus 10 may also include an external memory.

The CPU (Central Processing Unit) 31 is in overall control of operations by the information processing apparatus 10, and controls the respective components (32 to 37) via the system bus 38, which is a data transmission path.

The ROM (Read Only Memory) 32 is a nonvolatile memory that stores control programs and the like that the CPU 31 needs to execute processing. Note that programs may also be stored in a nonvolatile memory, such as a hard disk drive (HDD) 34 or a solid state drive (SSD), or an external memory, such as a removable storage medium (not illustrated).

The RAM (Random Access Memory) 33 is a volatile memory and functions as the main memory, work area, and the like of the CPU 31. That is, when executing processing, the CPU 31 loads the required program or the like from the ROM 32 into the RAM 33 and executes the program or the like to implement various functional operations. The learning model storage unit 110 and the data storage unit 120 depicted in FIG. 2 may be composed of the RAM 33.

As one example, the HDD 34 stores various data and information that are necessary for the CPU 31 to perform processing using a program. The HDD 34 also stores various data, various information, and the like obtained by the CPU 31 performing processing using a program or the like.

The input unit 35 is composed of a keyboard and/or a pointing device, such as a mouse.

The display unit 36 is composed of a monitor, such as a liquid crystal display (LCD). When configured in combination with the input unit 35, the display unit 36 may also function as a GUI (Graphical User Interface).

The communication interface 37 is an interface that controls communication between the information processing apparatus 10 and external apparatuses.

The communication interface 37 provides an interface with the network and executes communication with external apparatuses via the network. Various data, various parameters, and the like are transmitted and received to and from external apparatuses via the communication interface 37. In the present embodiment, the communication interface 37 may perform communication via a wired LAN (Local Area Network) or a dedicated line that complies with a communication standard, such as Ethernet (registered trademark). However, the network that can be used in the present embodiment is not limited to this and may be configured as a wireless network. This wireless network includes a wireless PAN (Personal Area Network) such as Bluetooth (registered trademark), ZigBee (registered trademark), and UWB (Ultra Wide Band). The wireless network also includes a wireless LAN (Local Area Network) such as Wi-Fi (Wireless Fidelity) (registered trademark) and a wireless MAN (Metropolitan Area Network), such as WiMAX (registered trademark). In addition, the wireless network includes a wireless WAN (Wide Area Network) such as LTE/3G, 4G, and 5G. Note that it is sufficient for the network to connect devices to enable communication between them, and the communication standard, scale, and configuration are not limited to the above examples.

At least some functions of the elements in the information processing apparatus 10 depicted in FIG. 2 can be realized by the CPU 31 executing a program. However, at least some of the functions of the elements in the information processing apparatus 10 depicted in FIG. 2 may operate as dedicated hardware. In this case, the dedicated hardware operates under the control of the CPU 31.

Hardware Configuration of User Apparatus 11

The hardware configuration of a user device 11 depicted in FIG. 1 may be the same as the hardware configuration depicted in FIG. 3. That is, the user device 11 may include the CPU 31, the ROM 32, the RAM 33, the HDD 34, the input unit 35, the display unit 36, the communication interface 37, and the system bus 38. The user device 11 displays various information provided by the information processing apparatus 10 on the display unit 36, and performs processing corresponding to an input operation received from the user via a GUI (composed of the input unit 35 and the display unit 36).

Generation Procedure of Learning Data

Figure 4:
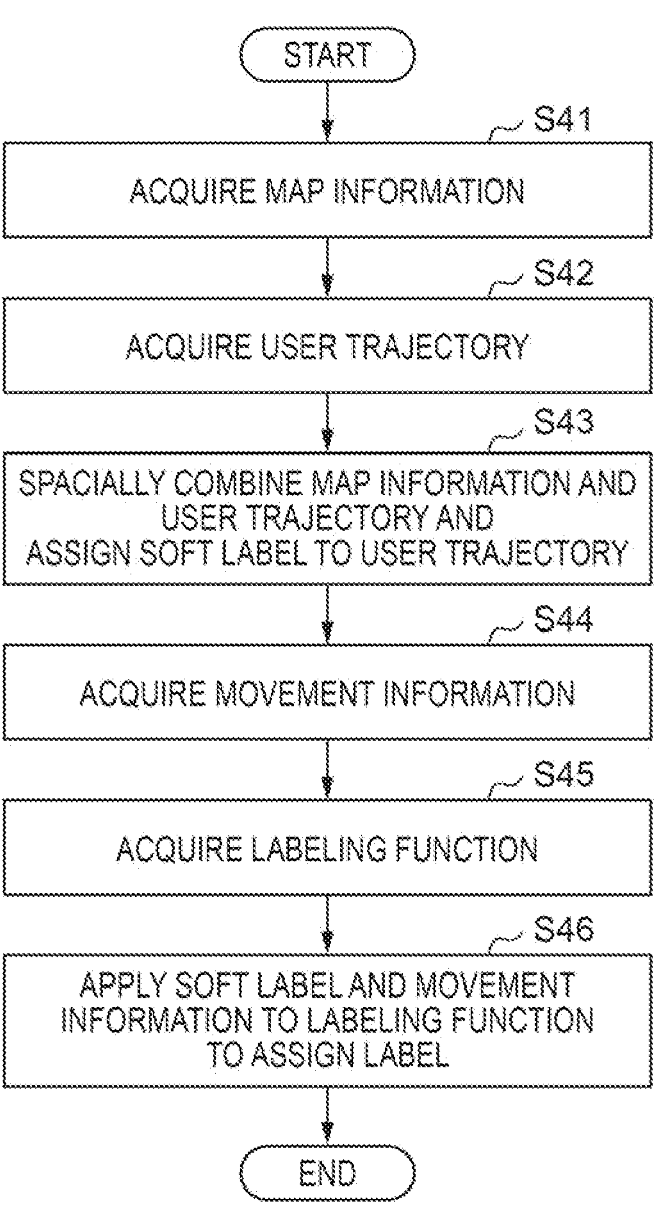
FIG. 4 is a flowchart of a generation process for training data.

Next, the generation procedure of training data according to the present embodiment will be described. FIG. 4 is a flowchart of the generation processing of training data implemented by the training data generation unit 104. Note that in the present embodiment, it is assumed that the user trajectory 121, the map information 122, the movement information 123, and the labeling function 124 have been stored in the data/function storage unit 120. For explanatory purposes, reference will be made to the information processing system depicted in FIG. 1.

First, in S41, the training data generation unit 104 acquires the map information 122 acquired by the map information acquisition unit 102 from the data/function storage unit 120.

In S42, the training data generation unit 104 acquires the user trajectories 121 of users 1 to N, which were acquired by the user information acquisition unit 101, from the data/function storage unit 120.

In S43, the training data generation unit 104 performs a spatial join operation that spatially joins the map information 122 and the user trajectories 121, and assigns soft labels to the user trajectories 121 ("soft labeling").

Figure 5:
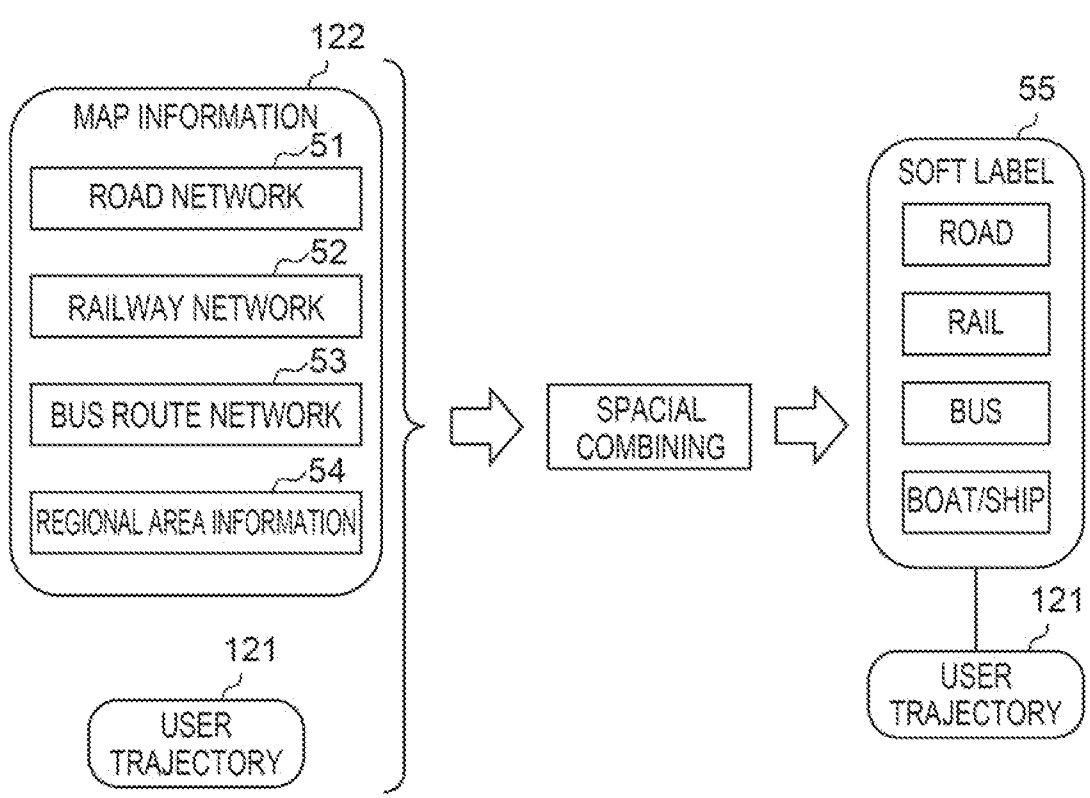
FIG. 5 is a conceptual diagram useful in explaining processing that assigns a soft label.

FIG. 5 is a conceptual diagram useful in explaining the processing in S43 (assignment of soft labels). In the present embodiment, the map information 122 includes a road network 51, a railway network 52, a bus route network 53, and regional area information 54. Note that the map information 122 depicted in FIG. 5 is merely one example, and the map information 122 may include information relating to other maps.

The road network 51 is road information representing roads (all overground roads that connect one place to another place). The railway network 52 is information on a railway route map. The bus route network 53 is information on route maps of scheduled buses. The bus route network 53 may also include information on route maps of buses in temporary operation. The regional area information 54 is information relating to boundaries of regional areas (as examples, prefectures or states), and also includes information on boundaries of ponds, lakes, and oceans.

The road network 51, the railway network 52, and the bus route network 53 may be represented by lines representing roads, railways, and bus routes, and the regional area information 54 may be represented by areas surrounded by boundaries (lines).

The training data generation unit 104 prepares soft labels 55 corresponding to the map information 122. Each soft label 55 is a label indicating traffic information corresponding to an area (region) or route (line) in the map information 122 that matches (or is likely to match) a user trajectory 121 when the user trajectory 121 is spatially combined with (that is, mapped onto) the map information 122. Each soft label 55 is a potential label for a label 61, described later. Each soft label 55 is "road", "railway", "bus", or "boat/ship". Note that these are mere examples, and other soft labels may be prepared. As one example, the soft labels 55 may include "other". "Other" may be used if a user trajectory 121 does not pass a line or area indicating a "road," "railway", "bus", or "boat/ship".

The training data generation unit 104 spatially combines the map information 122 and the user trajectories 121 and adds the soft labels 55 to the user trajectories 121. In more detail, the training data generation unit 104 maps a user trajectory 121 to the road network 51, the railway network 52, the bus route network 53, and the regional area information 54, and assigns the soft label 55 that corresponds to the user trajectory 121. As one example, if a user trajectory 121 is a trajectory that passes a line (route) indicated by the bus route network 53, the training data generation unit 104 appends that user trajectory 121 with the soft label 55 "bus". If a user trajectory 121 is a trajectory of movement within the area of a lake indicated by the regional area information 54, the training data generation unit 104 appends that user trajectory 121 with the soft label 55 "boat/ship". If a user trajectory 121 does not match any of the road network 51, the railway network 52, the bus route network 53, and the regional area information 54, the training data generation unit 104 may assign the soft label 55 "other" to that user trajectory 121.

Next, in S44, the training data generation unit 104 acquires the movement information 123 derived by the measurement apparatus 103 from the data/function storage unit 120. As mentioned earlier, the movement information 123 may include at least one of the speed, acceleration, jerk, bearing, or bearing difference between two points and the speed difference, acceleration difference, average speed, average speed difference, and average acceleration between a plurality of pairs of two points.

In S45, the training data generation unit 104 acquires the labeling function 124 from the data/function storage unit 120. The labeling function 124 includes a plurality of functions, each configured to output a label from the movement information 123 and/or the soft label 55. The labeling function 124 is generated by the training data generation unit 104 and is stored in the data/function storage unit 120. Note that the labeling function 124 may be generated in advance in the information processing system and stored in the data/function storage unit 120.

Figure 6:
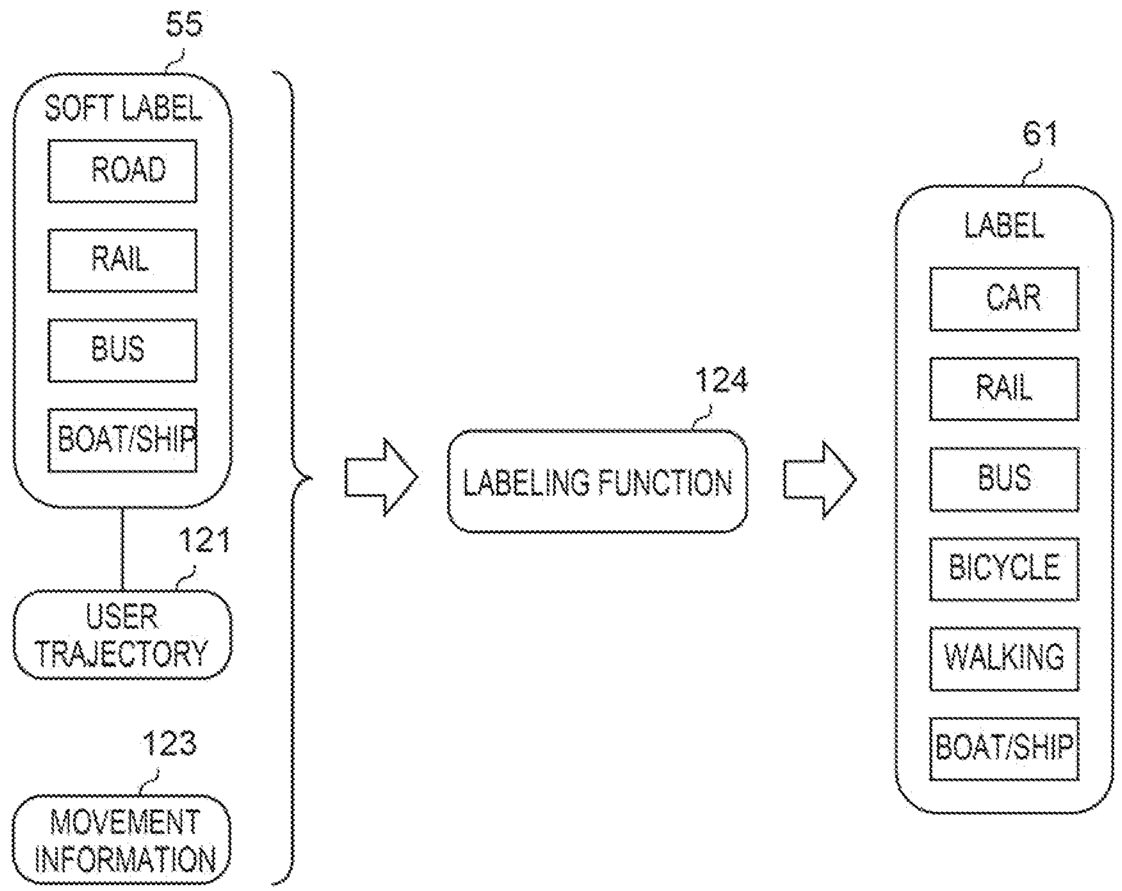
FIG. 6 is a conceptual diagram of inputs and outputs of a labeling function.

FIG. 6 is a conceptual diagram of the inputs and outputs of the labeling function 124. The labeling function 124 is a function that receives the soft labels 55 and the movement information 123 as inputs and outputs the labels 61. In the present embodiment, each label 61 corresponds to a mode of transport of a user (that is, a mode of transport being used by the user) and is assumed here to be "car", "train", "bus", "bicycle", "walking", or "boat/ship". Note that these are mere examples, and the labels 61 may include other labels.

Examples of the labeling function 124 are indicated below as [1] to [3].

[1] If the speed included in the movement information 123 is 15 m/s or higher and 33 m/s or lower, and the soft label 55 is not "train", output the label 61 "car".

[2] If the speed included in the movement information 123 is 2.5 m/s or higher and 10 m/s or lower, and the soft label 55 is "bus", output the label 61 "bus".

[3] If the speed included in the movement information 123 is 1.4 m/s or lower and the acceleration included in the movement information 123 is 1.5 m/$s^2$ or lower, output the label 61 "walking".

Note that the above function is a mere example, and the labeling function 124 may be configured to include a plurality of functions configured to output the label 61 from the movement information 123 and/or the soft labels 55.

In S46, the training data generation unit 104 applies the soft label 55 assigned in S43 and the movement information 123 acquired in S44 to the labeling function 124, and assigns the label 61 to the soft label 55 and the movement information 123. That is, the training data generation unit 104 assigns the label 61 to the combination of the user trajectory 121 to which the soft label 55 was assigned and the movement information 123.

Note that the processing in S45 and S46 may be implemented by a Snorkel platform. A Snorkel platform is an automated labeling platform.

The training data generation unit 104 can also modify the labeling function 124 based on an estimation result by the estimation unit 106. As one example, the training data generation unit 104 can change the speed value in the above Equation [1] based on the estimation result.

The training data generation unit 104 generates a data set in which the labels 61 have been assigned to the user trajectories 121, to which the soft labels 55 were assigned, and the movement information 123. That is, the training data generation unit 104 generates a data set in which a combination of a user trajectory 121 and the movement information 123 has been associated with a label 61 (correct data) indicating a mode of transport. The training data generation unit 104 performs the generation process for a data set a plurality of times to generate a plurality of data sets. The training data generation unit 104 stores the plurality of data sets in the data/function storage unit 120 as the training data 125.

In this way, the training data generation unit 104 generates the training data 125 based on the user trajectories 121. In more detail, the training data generation unit 104 generates the training data 125 using the user trajectories 121 and the movement information 123 derived from the user trajectories 121. This makes it possible to generate training data from the user trajectories 121, that is, from continuous position information of users, which makes it possible to generate training data efficiently without complicating the functions of the user terminals, such as by installing special sensors in the user terminals.

Through the settings of the labeling function 124, it is possible to distinguish, based on the user trajectories 121 and the movement information 123, between a car and a bicycle that are on the same road and assign appropriate labels. As one example, if two user trajectories passing along the same road have different speeds and/or accelerations, by setting the labeling function 124 with different speeds and/or accelerations as conditions, it is possible to distinguish between the two user trajectories and assign appropriate labels to the user trajectories.

Training Procedure for Mode-of-Transport Prediction Model 111

Figure 7:
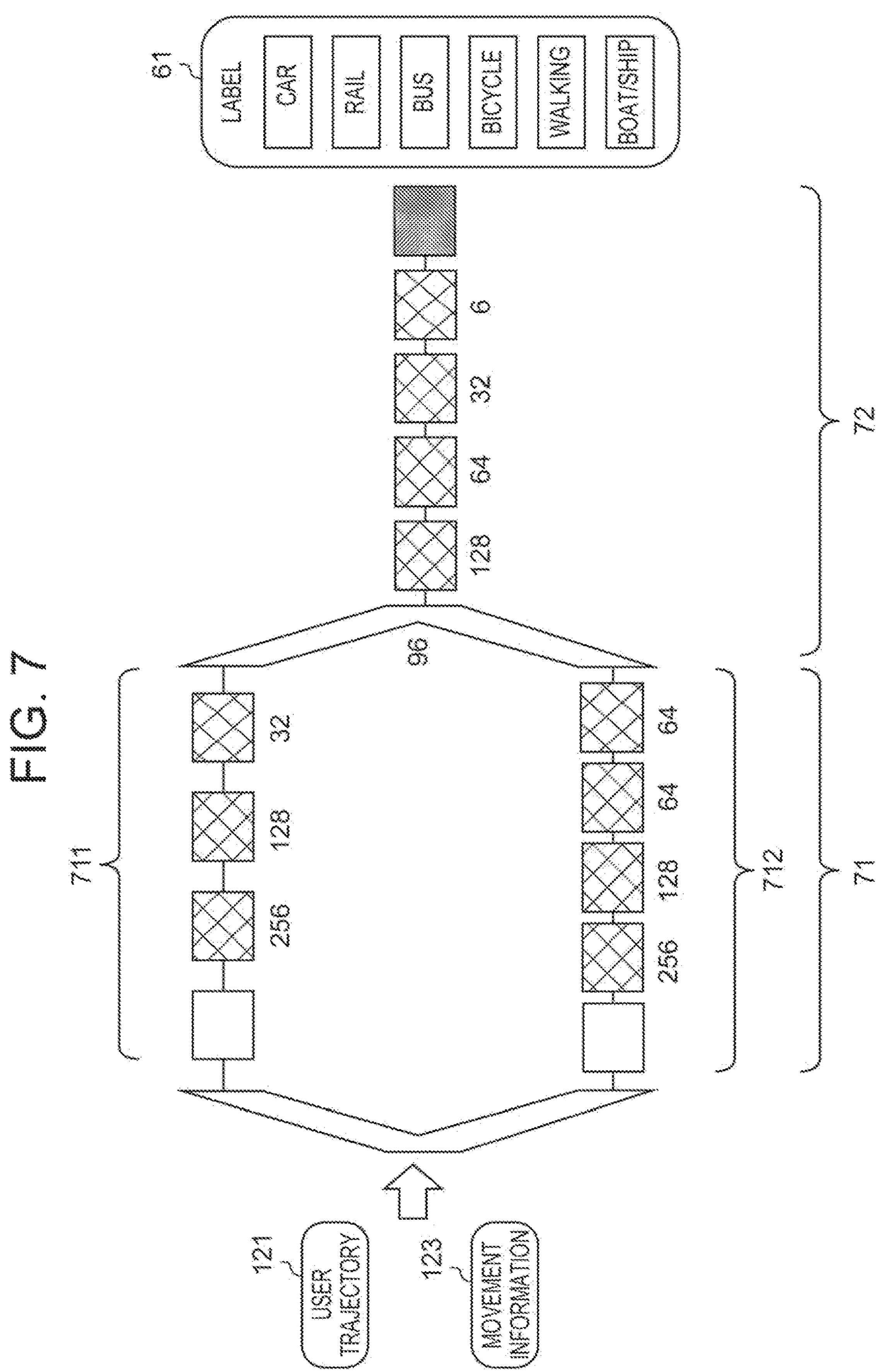
FIG. 7 depicts an example architecture of a mode-of-transport prediction model.

Next, the training procedure of the mode-of-transport prediction model 111 will be described. FIG. 7 depicts one example of the architecture of the mode-of-transport prediction model 111, which is a learning model for machine learning. The mode-of-transport prediction model 111 depicted in FIG. 7 is a deep learning model that uses a neural network.

As depicted in FIG. 7, the mode-of-transport prediction model 111 according to the present embodiment includes a first network 71 composed of a first branch 711 and a second branch 712, and a second network 72 that follows the first network 71. The first network 71 and the second network 72 each include an input layer, indicated by a white box, and a plurality of fully connected layers (or "dense layers") indicated by shaded boxes. The second network 72 also includes an output layer indicated by a gray box. The numeric values indicated on each layer represent the number of nodes (that is, the number of units). Note that the number of layers is not limited to the number depicted in FIG. 7.

The training unit 105 uses the training data 125 generated by the training data generation unit 104 to train the mode-of-transport prediction model 111. As described earlier, the training data 125 includes a plurality of data sets, and each data set has a label 61 associated with a combination of a user trajectory 121 and the movement information 123. Accordingly, the training unit 105 trains the mode-of-transport prediction model 111 about the relationships between a user trajectory 121 and movement information 123 and a label 61.

The training unit 105 inputs a user trajectory 121 (that is, data indicating a user trajectory 121) into the first branch 711, and inputs the movement information 123 (that is, data indicating the movement information 123) into the second branch 712.

On the first branch 711, feature amounts (that is, a feature vector) of the user trajectory is generated (extracted) from the user trajectory 121. Compressed (that is, encoded) feature amounts of the user trajectory are generated via the plurality of fully connected layers.

On the second branch 712, feature amounts (a feature vector) of the movement information is generated (extracted) from the movement information 123. Compressed (encoded) feature amounts of the movement information are generated via the plurality of fully connected layers.

As mentioned earlier, since the movement information 123 may include a plurality of values out of the speed, acceleration, jerk, bearing, and bearing difference between two points, and the speed difference, acceleration difference, average speed, average speed difference, and the average acceleration between a plurality of pairs of two points, the data size can become large. For this reason, in the architecture depicted in FIG. 7, the second branch 712 may have more layers than the first branch 711 and may generate compressed feature amounts of the movement information.

In the second network 72, first, the feature amounts of the user trajectory generated on the first branch 711 and the feature amounts of the movement information generated on the second branch 712 are combined to generate combined feature amounts (a combined feature vector). In addition, on the second network 72, the combined feature amounts are compressed (encoded) through a plurality of fully connected layers to generate six feature amounts that correspond to the number of labels 61.

The output layer is configured to generate, from these six feature values, and output data (that is, data indicating a mode of transport) representing the label 61 associated with the user trajectory 121 and the movement information 123 that were inputted into the mode-of-transport prediction model 111. An activation function (such as a softmax function) is used on the output layer. In the present embodiment, the output layer may be configured to calculate a probability (which is 0 to 1) of data being correct for each of six types of label (car, train, bus, bicycle, walking, and boat/ship) included in the training data 125 and to output as output data. Alternatively, the output layer may be configured to output 1 for the label with the highest probability of being correct out of the six types of label, and 0 for the other labels as the output data.

The training unit 105 calculates and/or adjusts parameters in the mode-of-transport prediction model 111 using a loss function to which the output data of the output layer and the correct answer data has been applied and thereby trains the mode-of-transport prediction model 111. The training unit 105 uses a plurality of data sets included in the training data

125 to train the mode-of-transport prediction model 111. The training unit 105 stores the trained mode-of-transport prediction model 111 in the learning model storage unit 110.

In this way, the mode-of-transport prediction model 111 according to the present embodiment inputs the user trajectory (raw data) acquired from the user and the movement information (derived data) derived from the user trajectory into different branches. The model then estimates the user's mode of transport from the combined feature amounts generated by combining the feature amounts of the raw data and the feature amounts of the derived data. By using two types of data, that is, the raw data and the derived data representing the features of the raw data, it is possible to estimate the mode of transport with higher accuracy.

Note that the training process may be performed separately for urban areas and rural areas. People move around a lot in urban areas, and training can be performed using the training data 125 composed of a large number of data sets. However in rural areas, people do not move around much, so there are few data sets for use during training. For this reason, the learning accuracy is likely to be higher in urban areas.

Mode of Transport Estimation Procedure

Figure 8:
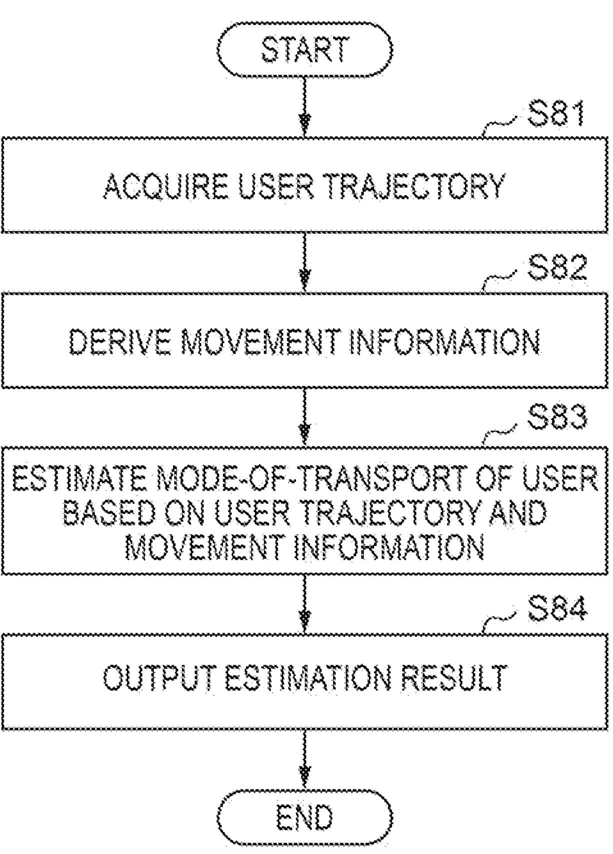
FIG. 8 is a flowchart of a mode-of-transport prediction process.

Next, the mode of transport estimation procedure according to the present embodiment will be described. FIG. 8 is a flowchart of mode of transport estimation processing according to the present embodiment. Note that in the present embodiment, it is assumed that the trained mode-of-transport prediction model 111 that has been trained as described above is stored in the learning model storage unit 110. For ease of explanation, the following description will refer to the information processing system depicted in FIG. 1.

First, in S81, the user information acquisition unit 101 acquires a user trajectory of a freely chosen user (hereinafter referred to as the "target user") in a certain period of time. The target user may be any of users 1 to N. The certain period of time may be set freely. As one example, the certain period of time may be a period during which the user is continuously moving (that is, the user does not stop for a long time).

In S82, the movement information derivation unit 103 derives the movement information, composed of features relating to movement on the user trajectory, from the user trajectory of the target user acquired in S81. As described earlier, the movement information may include one or more of the speed, acceleration, jerk, bearing, and bearing difference between two points, and the speed difference, acceleration difference, average speed, average speed difference, and average acceleration between a plurality of pairs of two points.

In S83, the estimation unit 106 estimates the mode of transport of the target unit using the trained mode-of-transport prediction model 111 based on the user trajectory acquired in S81 and the movement information derived in S82. In more detail, the estimation unit 106 inputs data indicating the user trajectory of the target user into the first branch 711 of the first network 71 of the mode-of-transport prediction model 111 depicted in FIG. 7 and inputs data indicating the movement information of the target user into the second branch 722. The mode-of-transport prediction model 111 calculates probabilities (which is 0 to 1) that each of the six types of label (car, train, bus, bicycle, walking, and boat/ship) are correct (that is, the actual mode of transport) from the inputted data as described above. Alternatively, the mode-of-transport prediction model 111 outputs 1 for the label with the highest probability of being correct out of the six types of label, and outputs 0 for the other labels.

The estimation unit 106 estimates the mode of transport corresponding to the label with the highest probability of being correct as the mode of transport of the target user.

Finally, in S84, the output unit 107 outputs information (the estimation result) on the target user's mode of transport estimated in S83. As one example, the output unit 107 outputs information that associates the target user and the estimation result to an external apparatus. The output unit 107 may also generate and output information based on the estimation result. As one example, the output unit 107 can generate and output an advertisement regarding the mode of transport estimated for the user trajectory. When the mode of transport estimated from a current user trajectory of the target user is a car, the output unit 107 can generate advertisements for tourist spots and/or service information near the target user's current location based on that current location and can provide such information to the target user. When the mode of transport estimated from the current user trajectory of the target user is walking, the output unit 107 can generate an advertisement regarding healthy living and provide such information to the target user.

Although estimation of the mode of transport of a target user has been described with reference to FIG. 8, by estimating the modes of transport of a plurality of users using the same processing, it is also possible to estimate an amount of traffic for each mode of transport in a freely chosen area during a freely chosen time of day. Estimating in this way can be useful for appropriate traffic planning or appropriate management of traffic.

Note that although a specific embodiment has been described above, the embodiment is a mere example and is not intended to limit the scope of the invention. The apparatus and method described in this specification may be implemented in forms aside from the embodiment described above. It is also possible to appropriately make omissions, substitutions, and modifications to the embodiment described above without departing from the scope of the invention. Implementations with such omissions, substitutions, and modifications are included in the scope of the patent claims and their equivalents, and belong to the technical scope of the present invention.

The disclosure includes the following embodiments.

[1] An information processing apparatus comprising: an acquisition unit configured to acquire a movement trajectory of a user; a derivation unit configured to derive, from the movement trajectory, movement information indicating features relating to movement; and an estimating unit configured to estimate, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

[2] The information processing apparatus according to [1], wherein the learning model is configured to output probabilities of a plurality of modes of transport being the mode of transport of the user, as the data indicating the mode of transport of the user, and the estimating unit estimates a mode of transport with the highest probability as the mode of transport of the user.

[3] The information processing apparatus according to [1] or [2], wherein the movement trajectory includes a latitude and a longitude of a location of the user at intervals of a predetermined time.

[4] The information processing apparatus according to any one of [1] to [3], wherein the movement information includes at least one of a speed, acceleration, jerk, bearing, and bearing difference between two points on the movement trajectory and a speed difference, acceleration difference, average speed, average speed difference, and average acceleration between a plurality of pairs of two points.

[5] The information processing apparatus according to any one of [1] to [4], wherein the mode of transport includes at least one of car, train, bus, bicycle, walking, and boat or ship.

[6] The information processing apparatus according to any one of [1] to [5], further comprising an output unit configured to output information on the mode of transport estimated by the estimating unit.

[7] The information processing apparatus according to [6], wherein the output unit generates and outputs an advertisement relating to the mode of transport estimated by the estimating unit.

[8] An information processing method comprising: an acquisition step of acquiring a movement trajectory of a user; a derivation step of deriving, from the movement trajectory, movement information indicating features relating to movement; and an estimating step of estimating, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

[9] An information processing program for causing a computer to execute information processing, the program causing the computer to execute processing comprising: an acquisition process for acquiring a movement trajectory of a user; a derivation process for deriving, from the movement trajectory, movement information indicating features relating to movement; and an estimating process for estimating, using a learning model, a mode of transport of the user from the movement trajectory and the movement information, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

[10] A learning model comprising: a first network including a first branch for inputting a movement trajectory of a user and generating feature amounts of the movement trajectory and a second branch for inputting movement information relating to movement derived from the movement trajectory and generating feature amounts of the movement information; and a second network configured to generate combined feature amounts by combining the feature amounts of the movement trajectory and the feature amounts of the movement information and to output data indicating a mode of transport of the user from the combined feature amounts.

REFERENCE NUMERALS AND SYMBOLS

1 to N: User
10: Information processing apparatus
11-1 to 11-N: User apparatus
101: User information acquisition unit
102: Map information acquisition unit
103: Movement information derivation unit
104: Training data generation unit
105: Training unit
106: Estimation unit
107: Output unit
110: Learning model storage unit
111: Mode-of-transport prediction model
120: Data/function storage unit
121: User trajectory
122: Map information
123: Movement information
124: Labeling function
125: Training data

The invention claimed is:

1. An information processing apparatus comprising:

at least one memory configured to store program code; and at least one processor configured to operate as instructed by the program code, the program code including:

training code configured to cause at least one of the at least one processor to:

acquire map information from an external source, acquire prestored movement trajectories from a storage of the information processing apparatus, assign soft labels corresponding to the map information to the prestored movement trajectories, acquire prestored movement information from the storage, output labels based on the soft labels and the prestored movement information, and generate a plurality of data sets, each data set of the plurality of data sets including a label among the labels associated with a corresponding prestored movement trajectory among the prestored movement trajectories and corresponding prestored movement information;

acquisition code configured to cause at least one of the at least one processor to acquire a movement trajectory of a user;

derivation code configured to cause at least one of the at least one processor to derive, from the movement trajectory of the user, movement information indicating features relating to movement; and estimating code configured to cause at least one of the at least one processor to estimate, using a learning model, a mode of transport of the user from the movement trajectory and the movement information, wherein the learning model is trained based on the plurality of data sets, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

2. The information processing apparatus according to claim 1, wherein the learning model is configured to output probabilities of a plurality of modes of transport being the mode of transport of the user, as the data indicating the mode of transport of the user, and the estimating code is configured to cause at least one of the at least one processor to estimate a mode of transport with the highest probability as the mode of transport of the user.

3. The information processing apparatus according to claim 1, wherein the movement trajectory includes a latitude and a longitude of a location of the user at intervals of a predetermined time.

4. The information processing apparatus according to claim 1, wherein the movement information includes at least one of a speed, acceleration, jerk, bearing, and bearing difference between two points on the movement trajectory and a speed difference, acceleration difference, average speed, average speed difference, and average acceleration between a plurality of pairs of two points.

5. The information processing apparatus according to claim 1, wherein the mode of transport includes at least one of car, train, bus, bicycle, walking, and boat or ship.

6. The information processing apparatus according to claim 1, where the program code further comprises output code configured to cause at least one of the at least one processor to output information on the mode of transport estimated.

7. The information processing apparatus according to claim 6, wherein the output code is configured to cause at least one of the at least one processor to generate and output an advertisement relating to the mode of transport estimated.

8. An information processing method performed by at least one processor and comprising:

acquiring map information from an external source;

acquiring prestored movement trajectories from a storage of an information processing apparatus;

assigning soft labels corresponding to the map information to the prestored movement trajectories;

acquiring prestored movement information from the storage;

outputting labels based on the soft labels and the prestored movement information;

generating a plurality of data sets, each data set of the plurality of data sets including a label among the labels associated with a corresponding prestored movement trajectory among the prestored movement trajectories and corresponding prestored movement information;

acquiring a movement trajectory of a user;

deriving, from the movement trajectory of the user, movement information indicating features relating to movement; and estimating, using a learning model, a mode of transport of the user from the movement trajectory and the movement information, wherein the learning model is trained based on the plurality of data sets, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

9. A non-transitory computer readable medium storing a computer program for causing a computer to execute processing comprising:

a training process for:

acquiring map information from an external source, acquiring prestored movement trajectories from a storage of an information processing apparatus, assigning soft labels corresponding to the map information to the prestored movement trajectories, acquiring prestored movement information from the storage, outputting labels based on the soft labels and the prestored movement information, and generating a plurality of data sets, each data set of the plurality of data sets including a label among the labels associated with a corresponding prestored movement trajectory among the prestored movement trajectories and corresponding prestored movement information;

an acquisition process for acquiring a movement trajectory of a user;

a derivation process for deriving, from the movement trajectory of the user, movement information indicating features relating to movement; and an estimating process for estimating, using a learning model, a mode of transport of the user from the movement trajectory and the movement information, wherein the learning model is trained based on the plurality of data sets, wherein the learning model includes a first network, which is composed of a first branch and a second branch, and a second network that follows the first network, the first branch generates feature amounts of the movement trajectory from the movement trajectory, the second branch generates feature amounts of the movement information from the movement information, and the second network is configured to generate combined feature amounts by combining the feature amounts of the movement trajectory and the feature amounts of the movement information, and output data indicating the mode of transport of the user from the combined feature amounts.

10. An information processing apparatus comprising:

at least one memory configured to store program code; and at least one processor configured to operate as instructed by the program code, the program code including:

training code configured to cause at least one of the at least one processor to:

acquire map information from an external source, acquire prestored movement trajectories from a storage of the information processing apparatus, assign soft labels corresponding to the map information to the prestored movement trajectories, acquire prestored movement information from the storage, output labels based on the soft labels and the prestored movement information, generate a plurality of data sets, each data set of the plurality of data sets including a label among the labels associated with a corresponding prestored movement trajectory among the prestored movement trajectories and corresponding prestored movement information;

estimating code configured to cause at least one of the at least one processor to estimate, using a learning model, a mode of transport of a user from the movement trajectory and the movement information, wherein the learning model is trained based on the plurality of data sets, wherein the learning model comprises:

a first network including:

a first branch configured to:

receive a movement trajectory of the user, and generate feature amounts of the movement trajectory, and a second branch configured to:

receive movement information relating to movement derived from the movement trajectory, and generate feature amounts of the movement information; and a second network configured to generate combined feature amounts by combining the feature amounts of the movement trajectory and the feature amounts of the movement information and to output data indicating a mode of transport of the user from the combined feature amounts.

* * * * *